United States Patent [19]

Yananton

[11] Patent Number: 4,774,907
[45] Date of Patent: Oct. 4, 1988

[54] NONWOVEN SCREEN FOR ODORLESS ANIMAL LITTER UNIT

[76] Inventor: Patrick Yananton, 1518 Little Hill Rd., Point Pleasant, N.J. 08742

[21] Appl. No.: 870,591

[22] Filed: Jun. 4, 1986

Related U.S. Application Data

[63] Continuation-in-part of Ser. No. 573,958, Jan. 26, 1985, Pat. No. 4,640,225, which is a continuation-in-part of Ser. No. 315,307, Sep. 4, 1984, Pat. No. 4,469,046, which is a continuation-in-part of Ser. No. 909,256, May 24, 1978, abandoned.

[51] Int. Cl.⁴ ............................................. A01K 29/00
[52] U.S. Cl. .......................................................... 119/1
[58] Field of Search ............................................. 119/1

[56] References Cited

U.S. PATENT DOCUMENTS 3,521,624  7/1970  Gander et al. ................... 128/132 D
3,669,106  6/1972  Schrading et al. .............. 128/132 D
3,752,121  8/1973  Brazzell ................................... 119/1
4,008,688  2/1977  Nicholas .................................. 119/1

Primary Examiner—Robert P. Swiatek
Attorney, Agent, or Firm—Sheldon H. Parker

[57] ABSTRACT

The combination of a sorbent pad laminate and a litter device for the collection of animal urine having a bottom sheet layer of moisture impermeable material, overlying the base of the device, an intermediate sorbent layer of material having a high sorbency capacity for urine and a top claw resistant screen. The bottom sheet layer and top screen are bonded to each other along at least a substantial portion of the periphery of the screen. The screen is a urine permeable, flexible member of nonwoven material which is substantially inert to urine, formed of strands randomly fused together at their intersections and having sufficient tear strength to withstand the clawing action of a cat.

21 Claims, 2 Drawing Sheets

NONWOVEN SCREEN FOR ODORLESS ANIMAL LITTER UNIT

CROSS REFERENCE TO RELATED APPLICATION

This application is a continuation-in-part of the patent application Ser. No. 573,958 filed Jan. 26, 1985, issued Sept. 11, 1986 as U.S. Pat. No. 4,640,225, which is a continuation-in-part of Ser. No. 315,307, filed Sept. 4, 1984, now U.S. Pat. No. 4,469,046, issued Sept. 4, 1984, which application is a continuation-in-part of Ser. No. 909,256, filed May 24, 1978, now abandoned, the subject matter and description of which is incorporated herein by reference thereto, as though set forth herein in detail.

BACKGROUND OF THE INVENTION

1. Field of the Invention

This invention relates to improvements in the rip proof screen for an odor preventing, disposable, sorbent pad-liner for an animal litter unit, and more particularly to a non-woven screen for use in combination with a sorbent padding, a liquid impermeable liner, a litter container and litter.

2. Brief Description of the Prior Art

Many domestic animals frequently use litter boxes for the elimination of body wastes. The boxes are usually filled with various kinds of sorbent granular materials such as sand, cat litter and the like, and must be periodically emptied and cleaned, which are somewhat objectionable tasks, since the sorbent granular material must be replaced and the boxes cleaned each time.

Cats, the most frequent users of litter boxes, present a further problem in that the urine of the feline has the most severe tendency to produce a pervasive odor problem. Apparently, cat urine contains the highest content of urea, when allowed to stand for any length of time in any litter material, releases an ammonia odor. In any event it is the odor associated with cat urine which is one of the most objectionable factors in the ownership of a cat.

In order to eliminate the odor caused by cat urine, the litter box must be changed frequently, this being an expensive, laborious and messy job.

Many patents have issued on devices for the indoor use by cats, such as U.S. Pat. No. 3,233,588. The invention disclosed in this patent employs the use of a screen which is placed on top of the cat litter. This patent does ease the problem of disposing of animal excrement, by merely lifting the screen and disposing of the feces lying on top. It does not however, contend with the problem of the odor created by the urine. The unit must be periodically emptied of its sorbent granules and thus only partly contents with the elimination of the mess and labor involved. U.S. Pat. No. 3,809,013 is similar, except that a stack of liners is placed under the litter. When the litter becomes soiled, the liner is lifted, the litter filters through screen covered holes in the center of the liner and the litter is reused with the next liner. Again, the excrement is disposed of neatly, however the odor problem remains.

U.S. Pat. No. 3,284,273 discloses an absorbent pad which can be used in combination with animals. Although this pad does contain absorbent capabilities, the odor from the urine of the animal is trapped, much as in the standard cat litter. The pad is not designed for repetitive, long term use in a cat box but rather to retain the urine in a disposable pad, by mopping up pools of urine left on floors or in cages, etc.

U.S. Pat. No. 3,476,083 discloses the use of deodorizing substances which are placed in the bottom of the receptacle. A screen is placed a short distance above, on which lies the standard kitty litter. The upper compartment receives the solid and liquid excreta, retains the solids and absorbs the bulk of the liquid allowing the excess liquids to drain through to the lower compartment. Although providing some neutralizing of the ammonia odor by deodorizing the urine which cannot be absorbed by the litter, it does not provide an effective means for deodorizing the bulk of the urine which has been trapped in the litter. The disposal of all the litter creates a substantial expense to the owner and the cleaning of the lower compartment would be unpleasantly laborious and rather messy. The spilling of the deodorizing substances (lime is suggested) would be objectionable as well as possibly harmful to the person handling the container if by chance some of the chemical substance was to come in contact with the skin.

U.S. Pat. No. 3,752,121, Brazzell, discloses a tray which holds a absorbent mat covered with artificial grass. "Below the artificial grass 31 and its backing sheet 32 there is provided a liquid absorbing pad 33 which may be composed of a plurality of layers of absorbant paper and/or a pad of absorbant fibers to absorb any liquid which seeps through the apertures in the artificial grass backing sheet." The Brazzell patent also recommends using a deodorizer after the animal has used the unit (deodorizer included with the unit at time of purchase). The purpose of the Brazzell absorbant layers is to hold the urine, encasing it between a bottom "impervious layer" and a top "nonabsorbant or impervious layer" of artificial grass. The trapment of the urine allows for bacteria to grow, causing odor. This bacteria growth prevents use of the pad for long periods of time.

While many additional patents could be cited regarding other variations of disposal systems, types of granular litter and containers none of systems of these patents have been found to overcome both the problem of odor and provide an easy, economical and convenient disposal and replacement. By way of contrast, U.S. Pat. No. 4,469,046 discloses and claims an effective means for handling the foregoing problems. However, due at least in part to the cost of producing a protective screen having the requisite characteristics, the protective screen is a major cost item in the system of the patent.

SUMMARY OF THE INVENTION

It has now been found that the protective screen of the aforenoted patent can be further improved through the use of a nonwoven screen which provides economic advantages over other types of screen material while, surprisingly, being capable of providing the rip resistant characteristics of a protective screen as required in the system of the aforenoted patent. Thus, in the instant invention the foregoing problems are overcome and an easy to use, low cost, odorless, disposable absorbent pad system for use in animal litter box is provided.

The odorless animal litter box can be a container as disclosed and claimed in U.S. Pat. No. 4,469,046, which locks in place the sorbent pad system, or a standard litter box, which can be combined with any affixing methods as disclosed in co-pending applications. The sorbent pad system includes a protective screening and a moisture impermeable liner. The protective screening is capable of withstanding the clawing action of an animal such as a cat, thus protecting the sorbent pad and the moisture impermeable liner. The sheet layer of sorbent material, positioned between the screen and the moisture impermeable material, has length and width dimensions equal to or less than that of the screen. The moisture impermeable material is at least equal to the length and width dimensions of the screen and they are sealed or affixed to each other along at least a substantial portion of the peripheral edge of the screen, or if substantially the same dimensions, at their common peripheral edge. The screen is a flexible member formed of strands bonded at their intersections and is formed of a material which is substantially inert to urine.

BRIEF DESCRIPTION OF THE DRAWINGS

The advantages and objects of the invention will become apparent and the invention will be more fully understood from the following specification, particularly when read in conjunction with the drawings, wherein.

DETAILED DESCRIPTION OF THE INVENTION

Figure 1:
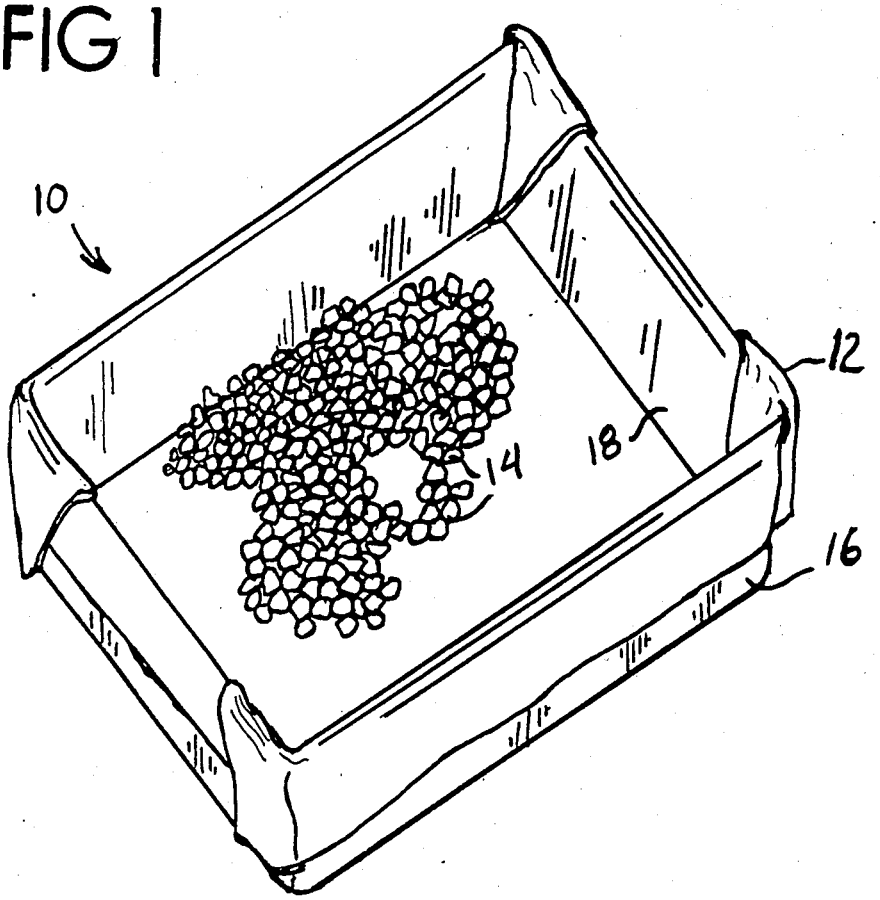
FIG. 1 is a perspective view of the assembled unit in accordance with the present invention.

In order to provide a clear understanding of the instant invention, the various aspects of the invention are hereinafter described in detail.

Granular Material 14

The granular material 14 as employed in the instant invention is utilized to satisfy the digging instinct of the animal and therefore need not provide absorptive qualities. Consequently, inexpensive materials, such as clay, can be used in accordance with individual preferences. Unlike the commonly employed systems in which the granular material must be used in quantity to provide the required absorptive qualities and digging qualities, minimal quantities of the granular material 14 can be used. The absorption quality of the layer 24 can provide the total or the predominant desiccation effect.

The litter material is commonly in granular form and must be in moisture transfer contact with the underlying sorbent material so that the urine can be drawn from the litter material into the sorptive layers. It should be noted that the terms sorbent, absorbent and adsorbant, in so far as they are used in regard to the present invention are essentially used interchangeably. The use of a surfactant on the screen material 18 can enhance the moisture transfer capability of the screen 18 and is essential in combination with hydrophobic or low hydrophilicity materials.

Absorbent Unit 12

The absorptive elements can be any material such as paper, tissue, pulp starch and related polymers, etc. which can disperse the liquid quickly, thus providing a large surface area for evaporation of moisture. In order to maintain a moisture free environment, it is necessary to evaporate from 5 to 20 ml. of liquid each time the system is used by the cat.

Examples of sorbent materials are those manufactured by Dow Chemical, disclosed in U.S. Pat. No. 4,117,184 and marketed under the designation DWAL 35 R. The Dow Chemical product is available as a laminate which has an indicated minimum liquid sorbency capacity of 28 grams per gram of laminate.

Alternatively, the super absorbent can be a hydrophilic polymer which has the ability to absorb and hold urine, such as the National Starch and Chemical Corporation product sold under the registered trademark PERMASORB.

Another example of an absorbent is the material sold under the trademark WATER-LOCK by Grain Processing Corp.

A ground paper pulp absorptive material has been found to provide a combination of high sorbency, high surface area and low cost. The large surface area provides for rapid urine evaporation and consequently is extremely effective in odor prevention.

Toxic chemicals or biologically active ingredients are not only unnecessary but preferably are avoided. U.S. Pat. No. 4,494,482 assigned to Proctor and Gamble relies on the use of 5000 to 30,000 ppm of a halogenated aromatic hydrocarbon bacteriostat in a sorbent pad to effectively control odor development. It has been found that if the sorbent material has the ability to sorb the urine, distribute the urine rapidly throughout its mass, and evaporate the urine faster than the bacteria can act on the urine, then the bacteria from the feces cannot grow in the absorptive layer because they are dried out and die or become dormant. Consequently, chemically or biologically active additives are not only unnecessary but undesirable.

Whereas, in conventional litter boxes, two to three inches of litter are required, in accordance with the present invention less than one inch of litter, and preferably no more than about one half inch, provides the desired results.

Screen Materials 18

A flexible, screen like mesh or permeable or semipermeable membrane is utilized to prevent the animal from clawing through to the sorbent layer 24. The screen material must, therefore, exhibit sufficient strength to with stand the clawing action of the animal. Even though the screen 18 is disposable, it is critical that the screen 18 be made of a material which is relatively inert to urine thereby preventing rapid corrosion of the screen 18 material, resultant odors and chemical activity. Some of the preferred materials of construction include polyester and polypropylene. Particularly in the case of hydrophobic materials, a surfactant must be used to prevent the screen 18 from acting as a liquid transfer barrier. While the particular surfactant which is used is not narrowly critical, by way of illustration the surfactant can be a non-ionic surfactant such as Tergitol. The mesh-like screen or netting 18 can be formed by the spun bonding process as well known in the art. While it would appear that screens formed by this process would not be capable of providing the required claw rip resistance without resorting to such a high material density that moisture transfer would be either precluded or severely restricted and cost would be excessive, it has been found that a critical balance of properties can be achieved.

Structural integrity of the screen 18 can be achieved by any of the known means which yields bonding of the strands at their intersections, as for example, through fusion of strands at the cross-over points or any other means which precludes relative movement of the strands.

FIG. 1 illustrates the assembled unit 10 of the instant invention. The sorbent unit 12 is inserted into the container unit 16, preferably with the screen region at least covering the inner walls of the container 16. As illustrated the sorbent unit 12 completely covers the interior of the container and overlies the outer walls. The granular material 14, which can be sorbent or non-sorbent, is placed on top of the sorbent unit 12 to provide the animal with the necessary scratching materials, if so required. The granular material 14 would not be required if the unit was being used for a dog or other animal which did not have the scratching instinct. Adhering and/or fastening systems, such as adhesive tape, elastic, etc. are described in co-pending applications and can be combined with the nonwoven screen disclosed herein in order to hold the sorbent member in place. The sorbent layer 24 preferably is about coextensive with the bottom of the container 16.

Figure 2:
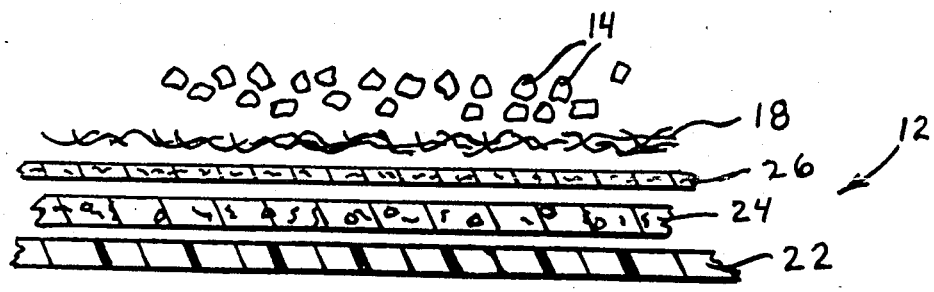
FIG. 2 is an exploded fragmentary view of the sorbent pad of the instant invention.

FIG. 2 shows a cross-section of the layers which form the sorbent unit 12. The outer layer 22 which is a thin plastic sheet of a material such as polypropylene or polyethylene prevents waste from making contact with the box and doubles as a bag when disposing of the soiled litter. The sorbent layer 24 is formed from a super sorbent material as previous stated herein.

The protective layer 26 is made from a durable, nonwoven tissue substance. If a binder is used for either the fabric of the tissue layer or other layer, it must be of a non-water soluble material. The protective screen 18 is of a flexible, durable substance which prevents the animal from scratching through to the bottom layers. The granular material 14 is placed on top of the sorbent unit as previously described herein.

Figure 3:
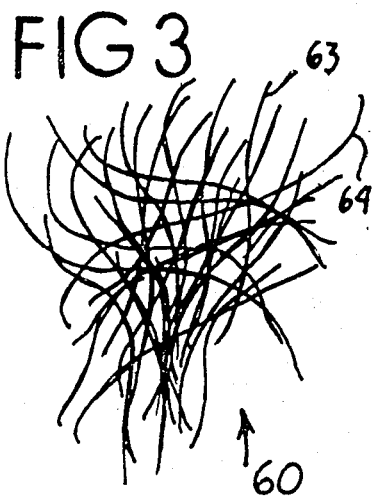
FIG. 3 is a fragmentary plan view of a screen for use with the instant invention.
Figure 4:
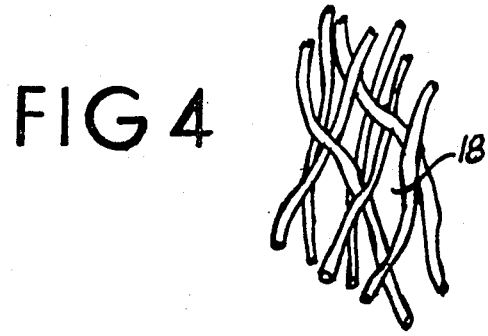
FIG. 4 is an enlarged view of a portion of the screen of FIG. 3.

The screen 60 of FIG. 3, is formed of strands 63 and 64 which are crossing one another in a random order, as well known in the nonwoven art. The instinct of cats to scratch at fabric puts a heavy stress on the screen and the clawing action can puncture or separate the strands to the point that the sorbent material 24 which underlies the screen can become exposed to the claws and torn apart. Since it is essential that the urine is free to pass through the screen 60 and any intermediate layers, such as one or more layers of tissue paper, to the sorbent material 24, neither the screen 60 nor the intermediate layers can offer restriction to the urine flow. For this reason, the screen 60 must have sufficient porosity and liquid resistance that beading or pooling of urine does not occur. The intersections of the cross strands are shown in FIG. 4, to be fused, as for example by means of heat. The nonwoven screening does not have woven fabric strands but rather strands placed one layer over the other, at random angles, prior to fusing. It has been found that this type of nonwoven structure can withstand intense clawing without separation of strands, thereby, protecting the inner layers from the claws of the cat. In this regard it is noted that the openings 14 of the screen 18 of FIG. 4, must represent a very high percent of the area of the screen 18 as compared to the area occupied by the solid area of the screen 18. The desired ratio has been found to be more reliably attainable with screens having strands fused at their intersections than by any other means. It must be understood that the opening cannot be so large that the cat can claw at the underlying layers. It is this later fact which results in the difficulty in attaining the required porosity.

Nonwovens have been known in the fabric industry for many years and have many uses. A nonwoven can be used to reinforce a weaker component, as for example in filtration systems and air filters and is well known for its light weight strength and versatility. While they are tested for many specific properties, the properties listed below are those which are critical to the instant application:

Abrasion resistance—the ability to resist pilling and weakening of certain sections to rubbing.

Air Permeability—the measure of the ease with which air will pass through a fabric. It is measured in cubic feet of air passing through a square foot of fabric in a minute at a given pressure differential across the fabric.

Burst Strength—measures the ability of a fabric to resist rupture by pressure. Burst strength is expressed in pounds per square inch of fabric. Specimens are clamped in rings and a diaphragm is expanded against the fabric until the fabric bursts.

Tear Strength—the measure of the force necessary to tear a fabric. It is expressed in pounds. In the trapezoid tear test, notched specimens are clamped in jaws and loaded until the fabric rips apart.

Repellency—the ability to resist sorbtion of a liquid substance.

Chemical and environmental resistance—the ability to resist penetration by chemicals, insects, mildew and bacteria.

The fabric used in the instant invention requires a high abrasion resistance to avoid pilling or wearing thin in certain sections. A fabric which pills from the rubbing of the animals paws would be unacceptable as the pilled fabric would attach itself to the animal's paws and be tracked through the premises. After some use of the litter unit, the pilled fabric could have sorbed small amounts of urine, which would be objectionable to users. The wearing thin of certain sections could lead to weakening of the screen and possible tearing, allowing access to the under layers.

The criteria of the bursting strength and tear strength are important to prevent ripping. The pressure exerted by an animal, especially by a cat, can put stress on the fabric in diagonal, horizontal and vertical directions simultaneously. If the protective screen is torn, the animal has access to the urine filled sorbent layer. The destruction of this layer by animal claws would be very undesirable.

The sorbent layer must be allowed to dry out and the bacteria aerated to the maximum extent. Thus, the air permeability of the fabric is critical as air is required to pprevent the accumulation of liquid urine and its odor, through evaporation and the maintenance of an aerobic environment. Since a flow of air in and out of the sorbent layer must occur, it is also essential that the quantity of litter employed does not produce an adverse effect.

The liquid repellency of the fabric allows all the urine to pass through the fabric onto the sorbent layer and prevents the urine from being sorbed into the fabric. The addition of surfactants allows the liquid waste to pass throughto the sorbent layer while preventing beading or puddling. The chemical and bacteria, etc. repellency of the fabric prevents the corrosion of the fabric by the urine as well as bacteria build up within the fabric.

The weight per mil of fabric is an important factor to regulate in order to prevent the fabric from adding unnecessary weight and cost to the litter pad unit. However it is an indication of the fabric strength and cannot be compromised in an effort to reduce weight of the unit. The minimum thickness would be about 2.5 mils, with a maximum requirement of about 7 mils. The preferred weight would be between 80 and 170 grams per square yard, the mil to gram ratio would naturally vary depending upon the fabric or screening used.

The process used to form the nonwoven can be any of the known processes, such as dry formed, wet formed, melt blown, thermal bonded, etc., however the spunbonded and spunlaced tend to come closest to meeting the criteria of the instant invention.

The adhesion of the nonwoven fabrics to the pad unit and screen C is a product sold under the trademark Reemay by DuPont.

Under actual in use field tests, the performance predicted by the simulated tests were achieved. In the narrow range from about 1 to about 1.5 oz./sq. yd. the optimum performance-cost factor relationship is achieved. The weight of at least 0.85 oz./sq. yd. is required to achieve the required performance while, at above 2 oz./sq. yd. the cost becomes undesirably high. As the fabric increases in thickness so does its rigidity, with increasing manufacturing difficulties in ratio to the added thickness. In higher weight fabric the performance degenerates because of the loss of air permeability, as will become evident from the following chart.

| Screen | Weight oz/sq. yard | Grab Tensile Strength (psi) Mach.* | Grab Tensile Strength (psi) Trans.* | Tear Strength (psi) Mach.* | Tear Strength (psi) Dir-Trans.* | Mullen-burst (psi) | (cfm/sq. ft.) Air Permeability |
|---|---|---|---|---|---|---|---|
| A | 1 | 35 | 22 | 11 | 8.5 | 42 | 450 |
| B | 1.5 | 54 | 34 | 16 | 12 | 58 | 250 |
| C | 2 | 80 | 54 | 21 | 16 | 80 | 160 |
| D | 1.4 | 32 | 28 | 12 | 13.5 | 32 | 302 |
| E | 1 | 21 | 19 | 7 | 8 | 15 | 650 |

Screen D was Lutrabond 1045 and screen C was DuPont Reemay 2200.
*Mach. (machine direction) the direction of flow of material through the machine. Trans. (transverse direction) the opposite direction of flow of material through the machine.

can be by a number of methods such as pressure sensitive glue, sonic welding, heat seal, hot melt, etc.

Resistance to Tearing and Abrasion—Test Protocol

Cats can exert about 4–8 pounds of force with each paw. This force is greatly magnified at the tip of the cat's pointy claws. The claws are not sharp like razor blades, but rather, are very pointy. It is the ability of these points to first puncture, then be pulled over a surface via the 4–8 lb force, repeatedly, that can puncture, abrade and tear certain materials. Various nonwoven, spun bonded nylon and polyester sheets of varying strength were subjected to puncture and tear tests as follows:

A steel block containing four sharp fish hooks, simulating cats claws, was placed on the surface of varying strengths of different types of selected nonwovens. Those nonwovens that allowed the hooks to immediately penetrate through the material were rejected. The sharp points of the hooks were able to immediately penetrate the flat sheets due to pore sizes that were too large, or because the intersections were too weak to hold the small pore opening. Next the acceptable sheets were placed on a rack 90° to the floor. The hooks were pushed into the nonwovens being tested until penetration was completed. Next, a 6 lb weight was added to the device to simulate a cat's pull. The following observations were made;

| weight of screen (ounce/sq. yd) | PUNCTURE screen A | TEAR screen A | TEAR screen B | TEAR screen C |
|---|---|---|---|---|
| 1.0 | − | − | + | − |
| 1.5 | − | − | − | − |
| 2.0 | − | − | − | − |

+ = tear or puncture
− = no tear or puncture

Screen A is a spun bonded nylon sold under the trademark Cerex by Monsanto and was found to provide the best puncture and tear resistance in the range from 0.85 to 2.0 oz./sq. yd. Screen B is a product sold under the trademark Lutradur LD 7230, by Lutravile In the 1 to 2 oz. range Screen A was found to be acceptable in its ripproof qualities as well as in its air permeability. In selecting a ripproof nonwoven the following chart the guidelines which predict acceptability:

| TEST | RANGE Preferred | RANGE Acceptable |
|---|---|---|
| Grab Tensile Strength (psi) | | |
| Machine Direction | >35 | >20 |
| Transverse Direction | >20 | >15 |
| Tear Strength (psi) | | |
| Machine Direction | >10 | >6 |
| Transverse Direction | >8 | >6 |
| Mullen Burst (psi) | >40 | >15 |
| Air Permeability (cfm/sq. ft.) | >150 | >100 |

A further benefit derived from the use of a nonwoven fabric is the wicking action of the long strands of the screen. The wicking action serves to transfer urine from the sorbent pad 24 to the atmosphere by conveying the liquid out from under the litter and up the sides of the sorbent unit 12.

The efficacy of the wicking action of the screen is greatest in combination with a non-absorbent litter since the absorbent litters tend to retain the liquid and counteracts the effect of the sorbent unit. The following chart illustrates the evaporation effect of the sorbent unit when used alone and in combination with a standard absorbent clay litter. In this case the screen was treated with a surfactant sold under the trademark Triton X-100. The sorbent unit was placed in a litter container with the absorbent section overlying the bottom of the container and the screen region extending up the sides of the container. The test was conducted at 73 degrees F. and 74% relative humidity. In the test, 300 ml. of water was added to the test unit and the net weight change was periodically measured. It should be noted that the + changes indicate a weight increase undoubtedly due to the clay being hygroscopic and absorbing moisture from the atmosphere.

|  | TIME in hours | | | | | | |
| --- | --- | --- | --- | --- | --- | --- | --- |
|  | 2 | 4 | 7 | 10 | 13 | 22 | 24 |
| 2 IN. | +3.2 | +1.3 | +.5 | +.7 | +1.2 | +3.5 | +.7 |
| 2" + L | +3.4 | +1.6 | +1.5 | +.6 | +1.1 | +2.2 | +.8 |
| 1" + L | +1.9 | 0 | −1..8 | −4.8 | −2.3 | −7.0 | −3.0 |
| 0.5" + L | −1.9 | −3.2 | −9.1 | −8.5 | −4.8 | −12.9 | −3.9 |
| 0.25" + L | −3.7 | −4.4 | −9.9 | −10.9 | −6.1 | −14.6 | −3.1 |
| LINER | −19.2 | −16.5 | −44.9 | −47.2 | −25.0 | −66.5 | −10.0 |
| WATER | −1.0 | −.7 | −.9 | −na | −2.1 | −2.2 | −.4 |

The wicking of the water up the sides of the screen to the top of the litter container was visually evident.

It is readily apparent from the foregoing that the use of two inches of an absorbent litter can actually retard the moisture evaporation, apparently due to the litter serving as a moisture barrier between the sorbent unit and the atmosphere. In actual use it has been found that the clawing and scratching of the cats tends to expose regions of the screen or at least greatly reduce the amount of litter covering certain regions of the screen. Although the ideal system would be free of litter the cats tend to reject a litter container which is totally litter free. The use of a non-absorbent litter which does not pack, or conversely, which permits the sorbent unit to "breath" minimizes the adverse effects of standard litters.

What is claimed is:

1. In the combination of a sorbent pad laminate for the collection of animal urine, comprising;
    a bottom sheet layer of moisture impermeable material; an intermediate sorbent layer of material having a high urine sorbency capacity;
    a top claw resistant screen means, said bottom sheet layer and said top screen means being bonded to each other along at least a substantial portion of the periphery of said screen means, the improvement comprising:
    said screen means being a urine permeable, flexible member of nonwoven fabric which is substantially inert to urine, formed of strands randomly fused together at their intersections and having sufficient tear strength to withstand the clawing action of a cat and sufficiently small hole size to protect said sorbent layer and said sheet layer of moisture impermeable material from being torn by animal claws.

2. The sorbent pad screen means of claim 1 wherein said strands forming said nonwoven fabric cross one another at random angles.

3. The sorbent pad laminate of claim 2 wherein liquids pass through said screen means to be sorbed in said sorbent layer without being sorbed by said screen means.

4. The sorbent pad laminate of claim 3 wherein said screen means further has a grab tensile strength greater than 20 psi, in the machine direction, and a grab tensile strength greater than 15 psi in the transverse direction.

5. The sorbent pad laminate of claim 3 wherein said screen means further has a machine direction strength greater than 6 psi, and a transvserse direction tear strength greater than 6 psi.

6. The sorbent pad laminate of claim 5 wherein said screen means has length and width dimensions which are at least equal to that of said sorbent layer.

7. The sorbent pad laminate of claim 3 further having a mullen burst strength greater than 15 psi.

8. The sorbent pad laminate of claim 1 whereby said screen means has a weight of between 0.85 ounces per square yard and 2 ounces per square yard.

9. The sorbent pad laminate of claim 8 wherein the screen means air flow is not less than 100 cfm/sq. ft.

10. The sorbent pad laminate of claim 8 wherein said nonwoven fabric of said screen means is treated with a surfactant.

11. The sorbent pad laminate of claim 10 wherein said litter granules are substantially non-urine sorbent and are less than about two inches deep.

12. The sorbent pad laminate of claim 1, further comprising a layer of tissue paper between said sorbent means and said screen means.

13. The sorbent pad laminate of claim 1 further comprising litter granules, said litter granules overlying said top claw resistant screen means.

14. The sorbent pad laminate of claim 1 further comprising securing means, said securing means being affixed to said moisture resistant sheet layer opposite said sorbent layer.

15. The sorbent pad laminate of claim 14 wherein said securing means is pressure sensitive adhesive tape.

16. In the combination of a litter device for use with cats and sorbent pad laminate means for the collection of animal urine, comprising: a litter device having a base and walls, sorbent pad laminate means for the collection of animal urine, and litter on said sorbent pad laminate means,
    wherein said sorbent pad laminate means includes
    a. a bottom sheet layer of moisture impermeable material, said sheet layer being in contact with said base and walls of said litter device;
    b. an intermediate sorbent layer of material having a high sorbency capacity for urine, said sorbent layer being in contact with said sheet layer;
    c. a top claw resistant screen means, wherein said screen means and said moisture impermeable material are substantially immovable with respect to each other, the improvement comprising:
    said screen means being a flexible member of fabric formed of strands randomly fused at their intersections forming a nonwoven fabric which is substantially inert to urine and having sufficient tear strength to withstand the clawing action of a cat and sufficiently small hole size to protect said sorbent layer and said sheet layer of moisture impermeable material being torn by animal claws.

17. The combination of claim 16 further including litter granules overlying said top claw resistant screen means.

18. The combination of claim 17 wherein said litter granules are substantially non-urine sorbent and is less than about two inches deep.

19. The combination of claim 17 further comprising securing means, said securing means fixing said sorbent pad laminate means to said litter device and preventing relative movement of said sorbent pad and said self supporting structure which can be caused by the clawing action of an animal.

20. The combination of claim 17 wherein said litter device is a self supporting structure.

21. The litter device of claim 20 wherein said self supporting structure is made of paperboard.

* * * * *